United States Patent
De Francesco et al.

(10) Patent No.: US 10,875,370 B2
(45) Date of Patent: Dec. 29, 2020

(54) SELF-STABILISING TWO-WHEELED VEHICLE, IN PARTICULAR AN AMPHIBIOUS VEHICLE

(71) Applicant: DEF-TECH SAS. DI ETTORE DE FRANCESCO & C., Rome (IT)

(72) Inventors: Eduardo De Francesco, Rome (IT); Ettore De Francesco, Rome (IT); Ruggero De Francesco, Rome (IT)

(73) Assignee: DEF-TECH SAS. DI ETTORE DE FRANCESCO & C., Rome (IT)

( * ) Notice: Subject to any disclaimer, the term of this patent is extended or adjusted under 35 U.S.C. 154(b) by 440 days.

(21) Appl. No.: 15/754,952

(22) PCT Filed: Sep. 7, 2016

(86) PCT No.: PCT/EP2016/071106
§ 371 (c)(1),
(2) Date: Feb. 23, 2018

(87) PCT Pub. No.: WO2017/042230
PCT Pub. Date: Mar. 16, 2017

(65) Prior Publication Data
US 2020/0254837 A1   Aug. 13, 2020

(30) Foreign Application Priority Data
Sep. 7, 2015  (IT) .................. 102015000048893

(51) Int. Cl.
*B60F 3/00* (2006.01)
*B60L 50/60* (2019.01)
(Continued)

(52) U.S. Cl.
CPC ............ *B60F 3/0007* (2013.01); *B60B 19/06* (2013.01); *B60L 50/60* (2019.02); *B62D 37/04* (2013.01);
(Continued)

(58) Field of Classification Search
CPC ........ B62D 61/00; B62D 51/00; B62D 51/02; B62D 11/02; B60F 3/0007; B60B 19/06
See application file for complete search history.

(56) References Cited

U.S. PATENT DOCUMENTS

| 1,357,571 A | 11/1920 | Knepper |
| 2,309,875 A | 2/1943 | Thompson |

(Continued)

FOREIGN PATENT DOCUMENTS

| DE | 31 03 961 A1 | 9/1982 |
| EP | 2 361 793 A1 | 8/2011 |

(Continued)

OTHER PUBLICATIONS

International Search Report, dated Oct. 28, 2016, from corresponding PCT application No. PCT/EP2016/071106.

*Primary Examiner* — Ruth Ilan
*Assistant Examiner* — Michael R Stabley
(74) *Attorney, Agent, or Firm* — Nixon & Vanderhye (57) ABSTRACT

Disclosed is a vehicle with only two parallel independent drive wheels, capable of moving on a solid or semi-solid ground, as well as on water if provided with blades on the wheels. The vehicle is stable in that it has a unit for lowering the center of gravity, which are housed in the wheels, which are in turn internally hollow for this purpose.

17 Claims, 6 Drawing Sheets

(51) Int. Cl.
*B60B 19/06* (2006.01)
*B62D 37/04* (2006.01)
*B63H 1/04* (2006.01)
*B63H 21/12* (2006.01)
*G05D 1/00* (2006.01)

(52) U.S. Cl.
CPC ............... *B63H 1/04* (2013.01); *B63H 21/12* (2013.01); *B60F 3/0038* (2013.01); *G05D 1/0011* (2013.01)

(56) References Cited

U.S. PATENT DOCUMENTS

| | | | | |
|---|---|---|---|---|
| 2,330,958 | A | | 10/1943 | Danforth |
| 2,341,109 | A | | 2/1944 | McLarty |
| 3,183,020 | A | * | 5/1965 | Hawver ................. B62K 17/00 280/208 |
| 3,313,365 | A | * | 4/1967 | Jackson ................. B62D 37/04 180/6.2 |
| 4,709,937 | A | * | 12/1987 | Lin .................... A63C 17/0086 280/11.209 |
| D322,821 | S | * | 12/1991 | Orejola ........................ D21/563 |
| 6,959,933 | B1 | * | 11/2005 | Roth ....................... A63C 17/08 280/11.19 |
| 7,188,694 | B1 | | 3/2007 | Blair |
| 7,703,568 | B2 | * | 4/2010 | Ishii ....................... A63C 17/12 180/218 |
| 8,562,387 | B1 | * | 10/2013 | Henthorne ............. A63H 29/22 180/167 |
| 9,499,228 | B2 | * | 11/2016 | Waeller .................. B62K 3/002 |
| 9,604,692 | B1 | * | 3/2017 | Kim ........................ B62D 51/02 |
| 2002/0011368 | A1 | * | 1/2002 | Berg ........................ B60K 7/00 180/218 |
| 2004/0182625 | A1 | | 9/2004 | Pal |
| 2005/0121238 | A1 | * | 6/2005 | Ishii ....................... B62D 37/00 180/65.1 |
| 2006/0260862 | A1 | * | 11/2006 | Nishikawa ............. B62K 17/00 180/315 |
| 2011/0303475 | A1 | * | 12/2011 | Kim ..................... B62K 11/007 180/218 |
| 2013/0032423 | A1 | * | 2/2013 | Chen ...................... A63C 17/08 180/218 |
| 2013/0238231 | A1 | * | 9/2013 | Chen ....................... B60L 15/20 701/124 |
| 2016/0129963 | A1 | * | 5/2016 | Ying ..................... B62K 11/007 180/6.5 |
| 2016/0318581 | A1 | * | 11/2016 | Kim ........................ B60L 50/60 |

FOREIGN PATENT DOCUMENTS

FR          841 951 A    6/1939
WO      01/28796 A1    4/2001

\* cited by examiner

SELF-STABILISING TWO-WHEELED VEHICLE, IN PARTICULAR AN AMPHIBIOUS VEHICLE

TECHNICAL FIELD

The present invention generally refers to the field of self-propelling vehicles, capable of preferably moving in water but as well as semi-solid ground such as mud, ice, sand, snow or the like.

A vehicle thus made could be used for mountain rescue, transporting products/goods to places that are difficult to access (research purposes in Arctic areas), movement in wet areas, or the like. However, the vehicle could be used in other numerous situations different from the ones mentioned above, also including water recreational activities, fishing, etc. It could be used by the civil protection department, for example by firemen during floods or other natural calamities.

TECHNICAL BACKGROUND

Various types of vehicles capable of moving in water or semi-solid surfaces, such as for example snow, have been developed in the past. Examples of means for movement in water include personal water crafts: for example, they can be used both for recreational and other purposes such as spotting people in danger, etc.

On snow, similar to the personal water crafts, there is the snowmobile. Both of these vehicles are driven by at least one person and they are suitably designed to move on such surfaces. These vehicles can be used both for recreational and rescue purposes. The snowmobile has "skis" or directable sledges underneath whereas the personal water craft has an internal combustion engine with a water jet pump for the propulsion thereof. This means that depending on the surface on which the vehicle moves, the latter varies considerably in terms of shape and type of propulsion, etc.

In addition, these vehicles (snowmobile and personal water craft, or the like) are not remote controlled but driven by people. Thus, they cannot be used to approach dangerous sites, without exposing the person in danger, for example when it comes to taking foodstuffs or medicinal products to people in isolated areas (in the mountains for example), for finding bodies under the snow in case of avalanches, etc.

There are other types of water/amphibious vehicles mainly or exclusively used for recreational purposes, and thus not for generic use. The water tricycle is for example a vehicle exclusively designed for fun. It can capsize easily for example in case of strong wind, given that it substantially completely floats on water and it has a high centre of gravity. This means is propelled by the muscle power of the occupants.

On the other hand, the snowcat has the characteristic of having a very low centre of gravity and thus capable of moving on slopes characterised by sharp inclination without the risk of overturning. However, besides the snowcat being rather heavy, overly cumbersome and expensive, its main purpose is to clear snow, thus serve as a bulldozer, and it usually cannot be used for mountain rescue operations.

SUMMARY OF THE INVENTION

The object of the present invention is to provide a valid alternative to the currently available means, mainly amphibious vehicles, and more generally vehicles that can mainly move on substantially unstable surfaces (mud, ice, sand, snow, etc.)

The vehicle, subject of the invention, must have a low centre of gravity and thus be substantially stable. In addition, the vehicle must have self-propelling means. The vehicle should be capable of being remote controlled and not require the presence of a person on board. The conception/design of the vehicle should be such that it can inherently adapt to the various surfaces in question, without requiring particular modifications when passing from one surface to another. Thus, the amphibious vehicle could for example pass from a water navigation mode to movement on the beach, or on a surface covered with ice/snow or go up a stream and easily move on a swampy/muddy area, etc.

According to another aspect of the present invention, the vehicle should be easy to design. This means that in the simplest and least accessorised version thereof, the vehicle could have a very low cost. This allows the use of the vehicle of the invention even in situations where it is exposed to the risk of being damaged, even irreparably (mountain areas with crevasses, etc.)

Another object of the invention regards the "degrees of freedom" of movement of the vehicle. According to the present invention, the vehicle should preferably have the possibility to advance in straight movement, turn around on the spot, move on any curved trajectory, reverse in a straight movement and reverse on any curved trajectory.

Another object of the present invention lies in providing an amphibious vehicle or the like, in which in the simplest version thereof, it can have an extremely compact shape and thus have minimal overall dimensions. Thus, in this case the vehicle may form a small robot—instead of moving a large useful load—and thus simply be used for search purposes.

These and other objects and advantages of the invention will apparent from the following detailed description as well as the attached claims.

DESCRIPTION OF THE DRAWINGS

The following invention will now be described, purely by way of illustrative and non-limiting or non-binding example, with reference to the attached drawings, wherein.

DETAILED DESCRIPTION OF SOME POSSIBLE EMBODIMENTS OF THE INVENTION

FIGS. 1 to 9 show three possible embodiments of the invention, currently deemed preferred. However, they are provided purely by way of non-limiting example as regards the present inventive concept. The purpose of the drawings is to place the man skilled in the art in the condition to understand and implement the invention at will but not address all possible technical details of realisation. This is not part of the purpose of a patent.

In addition, in FIGS. 1 to 9 same components of the device, or functionally similar components, are indicated using identical or similar reference symbols/numbers so as to avert the risk of confusion. In addition, in order to avoid repetitions, the second and third embodiment will be described in a more concise fashion, making reference to the first embodiment as regards the several components shared in common with these embodiments. The three embodiments shown in FIGS. 1 to 9 have the same inventive concept in common. Thus, the following detailed description will begin from these traits in common.

The generally used amphibious vehicle (the word "amphibious" is used hereinafter including the unstable surfaces of any other type besides water) has the characteristics of being inherently stable and being capable of moving on any curved trajectory using two parallel wheels for the movement thereof. In the case of water, the wheels will obviously be of the floating type.

Figure 3:
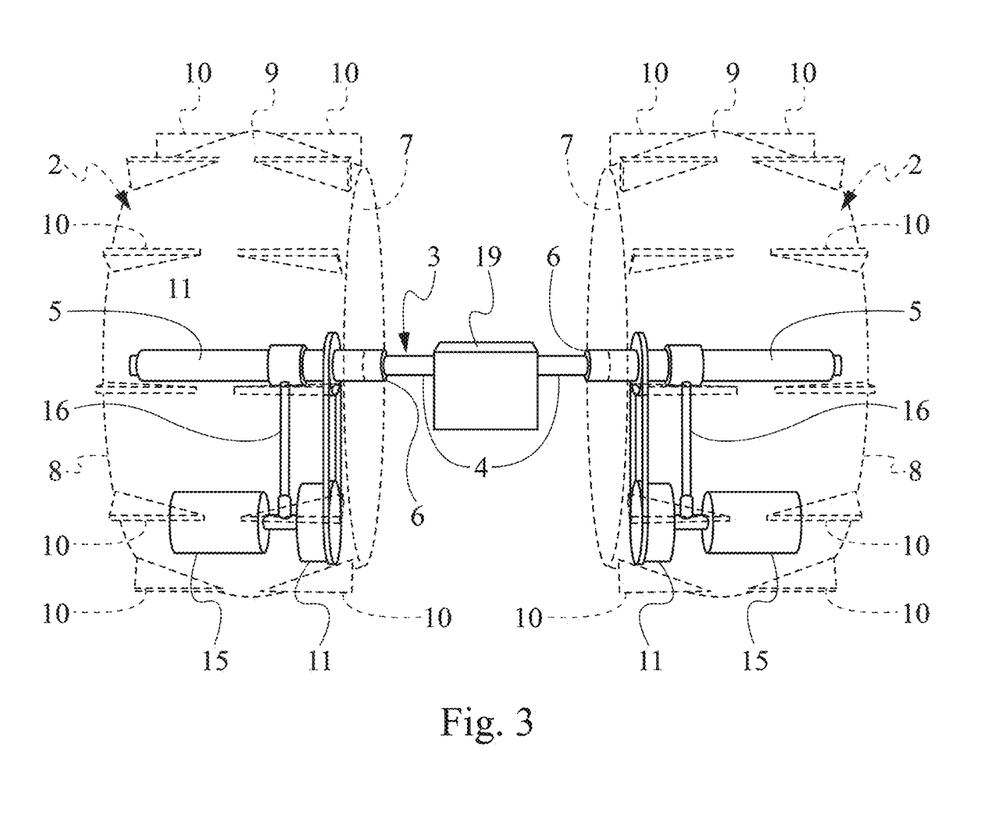
FIG. 3 shows the first embodiment of the invention, in a front perspective view.
Figure 4:
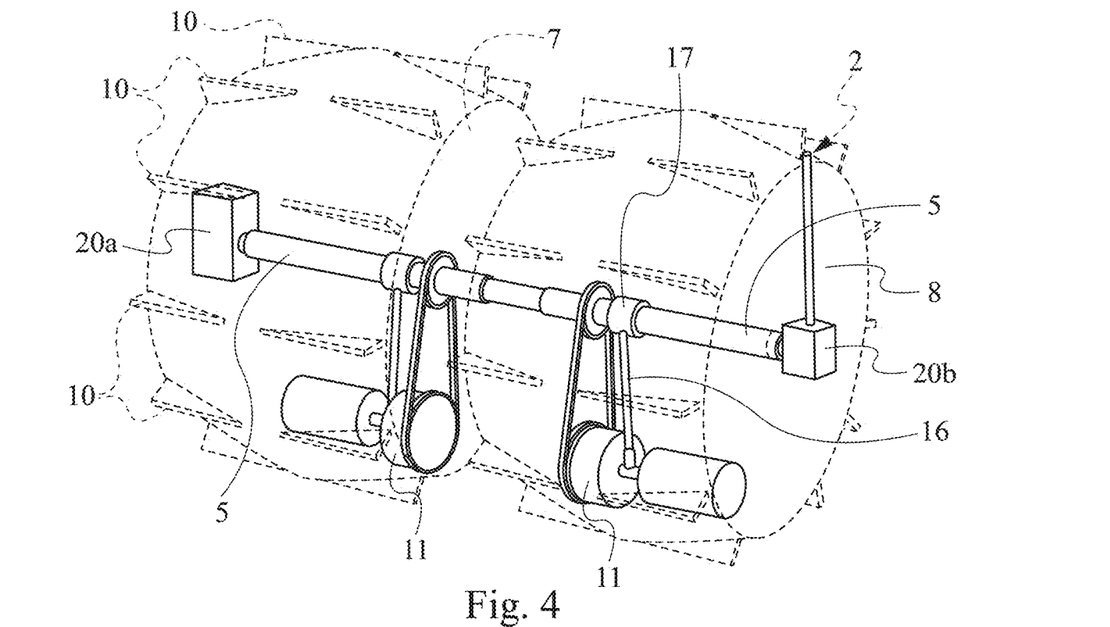
FIG. 4 shows a second possible embodiment of the invention, in a perspective view with a first angle.
Figure 5:
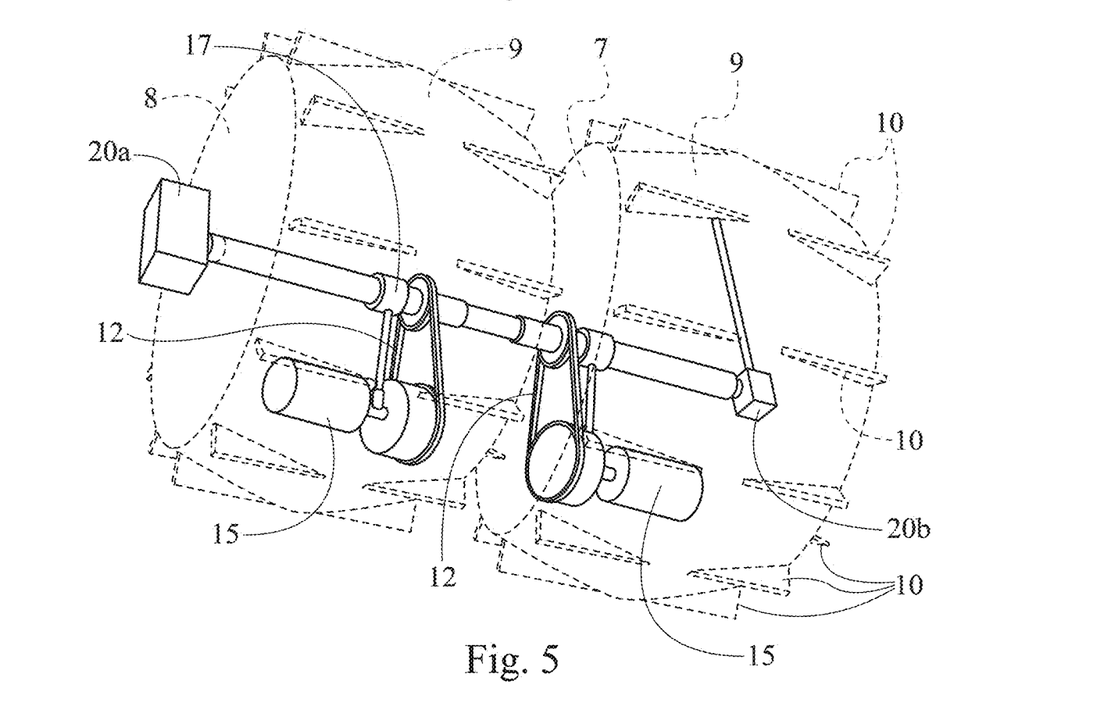
FIG. 5 shows the second embodiment of the invention, in a perspective view with a second angle (bottom view)

The amphibious vehicle 1, subject of the invention, has two hollow cylindrical floating bodies 2, connected to each other by a longitudinal central element 3 substantially extending over the entire length of the amphibious vehicle 1 and which is in turn made up of a central axle 4 and two secondary axles 5, right and left, located on the right and left side respectively side with respect to the central axle 4 (see for example FIG. 3).

Two decouplers 6, provided with suitable bearings (not shown), are provided at the transition points between the central axle 4 and the corresponding secondary axle 5, left and right respectively. The decouplers 6 enable the two secondary axles 5 to rotate independently with respect to each other as well as independently from the central axle 4.

Each of the two secondary axles 5 pass through the centre of the respective floating body 2. In FIG. 3, each decoupler 6 coincides with an end of a secondary axle 5 and it is rigidly connected to a centre (faced towards the central axles 4) of the respective floating body 2. However, in another possible embodiment, not shown in the figures, it is obvious that the decouplers 6 could be arranged more towards the centre, thus the secondary axles 5 projecting further from the respective flat face 7 of the floating body.

Each floating body 2 is substantially cylindrical and hollow-shaped, and it has two flat-shaped outer lateral surfaces 8, two inner lateral surfaces 7 flat-shaped and facing towards the central axle 4, as well as a convex surface 9 having a plurality of grip/advancement tabs 10, which enable the amphibious vehicle 1 to advance on the water surface, on a muddy ground, on the snow, etc., when the "wheels" 2 are rotated by drive means which will be described hereinafter.

A fundamental characteristic of the present invention lies in the fact that the centre of gravity of the system is located beneath the longitudinal central element 3 (made up of the central axle 4 and two secondary axles 5) passing through the centres of the two wheels 2 (floating bodies 2). This allows conferring stability to the amphibious vehicle 2 as further described hereinafter.

Drive means 11 (e.g. electric motors 11) are housed in the respective floating body 2 and they allow rotating, one independently from the other, the two secondary axles 5, which in turn rotate the two floating bodies 2 one independently from the other. Suitable—and possible—transmission means allow transmitting motion from the motors 11 to the two secondary axles 5. Specifically, in the shown and preferred embodiments, said transmission means comprise, for each wheel or floating body 2: a first gearwheel 14 which draws motion from the output axle of the corresponding motor 11, a transmission chain 12, and a second gearwheel 13 (see FIGS. 1 and 2). The first gearwheel 14 is integrally joined to a horizontal oscillating axle 18 (see the description hereinafter and FIG. 2), the second gearwheel 13 is integrally joined to the corresponding secondary axle 5, and transmission chain 12 extends between the two gearwheels 13 and 14.

Figure 1:
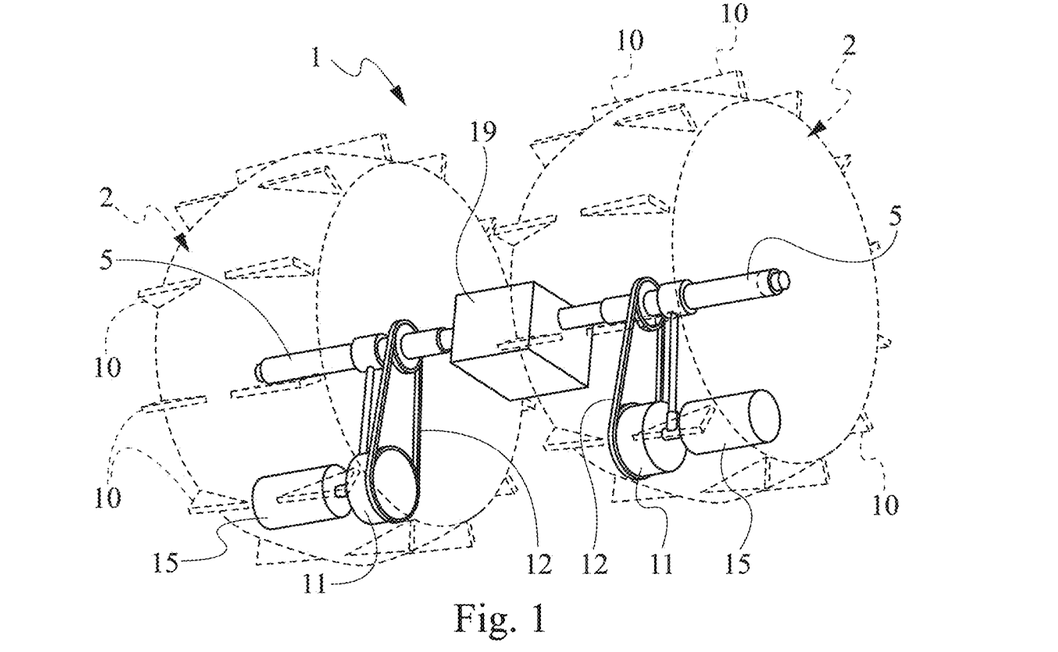
FIG. 1 shows a first possible embodiment of the invention, in a bottom perspective view.
Figure 2:
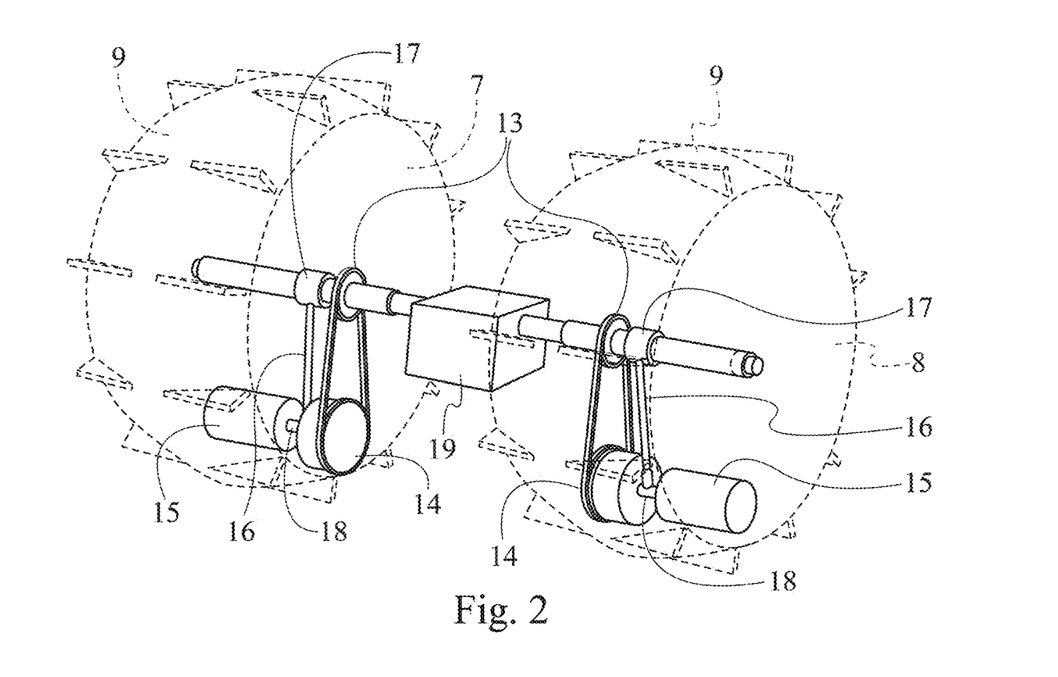
FIG. 2 shows the first embodiment of the invention, in a perspective view according to another angle.

In the first embodiment shown in FIGS. 1 to 3, the aforementioned characteristic, of "low centre of gravity"—i.e. located constantly, during the motion of the amphibious vehicle 1, beneath the longitudinal central element 3 and preferably as close as possible to the internal diametral surface (opposite the external convex surface 9) of the floating body 2—is obtained by mounting the drive means 11 beneath the secondary axles 5 and as close as possible to the internal diametral surface of the floating body 2. Also the batteries 15 of the corresponding electric motors 11 are mounted in a manner such to lower the centre of gravity of the amphibious vehicle 2 constantly beneath the longitudinal central element 3 and as close as possible to the internal diametral surface of the floating body (or wheel) 2. Specifically, in the first embodiment of the invention, shown in FIGS. 1 to 3 all this is obtained by providing—inside the corresponding floating body 2—an oscillating arm 16 rigidly fixed, at one end, to a bushing (sleeve) 17, free to rotate on the corresponding secondary axle 5 but axially fixed with respect to the latter, said oscillating arm 16 being fixed, at the opposite end thereof, to a horizontal oscillating axle 18 (FIG. 2) which supports the motor 11 and the batteries 15 and which is constantly parallel to the corresponding secondary axle 5 during the motion of the amphibious vehicle 1. During the motion of the amphibious vehicle 1, the oscillating arm 16 does not oscillate considerably and it maintains the stability of the amphibious vehicle 1. This guarantees that the amphibious vehicle 1 is not exposed to the risk of overturning, in that the balance position thereof is the erect one.

The principle of lowering the centre of gravity should not necessarily involve the motor, the battery and the drive means in general 11 as well as the accessories thereof, in any action whatsoever. However, given that the drive means 11 are indispensable towards the operation (self-propulsion) of the vehicle, it is preferable that they at least contribute to lowering the centre of gravity, so as to reduce the weight of the vehicle. It would thus be inadvisable (though not forbidden) to provide for large inert elements (ballast) on the opposite side of the secondary axle 5 with respect to the motors 11. Ballast could instead contribute, this being advisable, to further lowering the centre of gravity in combination with the motors.

As mentioned previously, the motors 11 inside the cylindrical floating bodies 2 apply a torque of forces that rotate the wheel or floating body 2 alongside the relative secondary axle 5 rigidly connected to the wheel 2. The secondary axles 5 may rotate independently from the central axle 4, and this enables the vehicle 2 to move. Thus, by suitably designing the masses and volumes of the amphibious vehicle 2, the amphibious vehicle 2 is capable of floating, thus replicating the principle of the movement of the wheels on dry land on water. Generally, this means that it is possible to obtain the following types of movements on solid, semi-solid (mud, ice, sand, snow, etc.) and water:
1) Straight movement
2) Turning on the spot
3) Movement on any curved trajectory
4) Straight reverse movement
5) Reverse movement on any curved trajectory The aforementioned types of movement were (see above) among the objects of the invention. In the light of the technical means described above, it is clear that the vehicle 1 is concretely capable of attaining such movements In particular, turning on the spot represents a valid tool in case of movement in narrow spaces (paths with precipices, etc.), to invert the direction of movement. Turning on the spot can for example be obtained by inverting the direction of rotation of one of the motors 11 with respect to the other. In this manner, the wheels 2 rotate in the opposite direction around the geometrical axis defined by the secondary axles 5 and the central axle 4.

The efficiency of the movement in water depends on the shape of the floating bodies 2. A useful load, transported by the amphibious vehicle 1, could be engaged to any point of the amphibious vehicle 1, typically to the central axle 4 (see reference 19, first embodiment of the invention shown in FIGS. 1-3).

For given types of loads 19 engaged to the central axle 4, where the stability of the latter is required (for example antennas or sensors), or the non-overturning of the same is required, it is also indispensable that the masses connected to the central axle 4 determine a centre of gravity located beneath this central axle 4. To this end, it should be observed that the secondary axles 5, the floating bodies 2 and the motors 11 have no impact, in that they are decoupled by means of the decouplers 6.

In the first embodiment according to FIGS. 1-3, a general load 19 was selected, schematically represented by a parallelepiped-shaped element positioned between the two floating bodies 2 and connected to the central axle 4. The load 19 is arranged so that the centre of gravity thereof is located beneath the central axle 4, and given that this is the only mass bound to the axle (the latter is obviously of the rotational symmetric type), the load 19 is stable and positioned erect.

It should be observed that the two reference numbers 6 actually only indicate the position of the decouplers 6, given that the relative systems/bearings that guarantee independent rotation between the secondary axles 5 and the central axle 4 are not visible, in that they are located inside corresponding secondary axle 5.

The two motors 11 are driven independently with respect to each other through remote control. By driving them at the same speed, the vehicle 1 moves in one direction. Speed difference between the two wheels 2 transforms into a rotary movement of the vehicle around a vertical axis. This allows obtaining the kinds of movement listed above.

Preferably, the cross-section of the cylindrical floating bodies 2 is not constant; it is maximum at the centre and progressively reduces towards the two lateral faces or flat bases 7, 8. As previously mentioned, the tabs or blades 10 are positioned on the convex surface 9.

When the vehicle is of dry or semi-solid ground, the wheels 2 mainly lie with the part having a larger section while the blades 9 are raised or half-raised. When the vehicle is in water, the various tabs or blades 9 reach (e.g. periodically in case of movement at a constant speed) a level located beneath the floating line of the amphibious vehicle 2, thus considerably improving the mobility of the means.

It should be observed that in the shown and preferred embodiment, during movement in water the motors 11 are also beneath the floating line. This brings also the centre of gravity of the means below the floating line, thus considerably increasing stability.

Before proceeding with the other two preferred embodiments of the invention, shown in FIGS. 4-9 and which share many points in common with the first embodiment of the invention, the following should be observed.

Firstly, the described drive means are provided solely for illustrative purposes and they could comprise internal combustion engines, hydraulic motors and so on and so forth. The hydraulic components, in particular, would guarantee lesser wear out and thus less maintenance of the vehicle 2.

Secondly, as regards the motion transmission components, it is obvious that they could comprise not only chains and gearwheels, as outlined, but—alternatively or additionally—also gearboxes of any type, e.g. epicyclic gears, straight cut gears, helical gears, etc., toothed crowns with internal/or external gears, sintered metal gears or the like.

Thirdly, the floating bodies 2 will be provided with any known means to ensure airtight sealing between the internal and the external, in particular at the decouplers 6. In addition, all sensitive components (motor, battery, etc.) shall also be possibly provided with waterproofing means.

Thus, the invention shall not be deemed limited to the embodiments shown in the figures nor shall the interpretation thereof solely regard the disclosure provided directly and dogmatically by the drawings only. Indeed, it is inadvisable to overly emphasize these and other details that can be easily implemented by a man skilled in the art, i.e. applicable to the present invention to overcome given problems (for example the airtight sealing, reducing the noise of the motor and transmission means, etc.). Obviously, the market currently offers hybrid motors, with components made both of metal and synthetic material (polymers) which are capable of optimally reducing noise. Thus, the man skilled in the art will choose the production process and materials deemed most appropriate, as well as the most suitable shapes and dimensions, depending on the requirements of a particular application in terms of costs, consumptions, performance, etc. The materials of the floating bodies could be of various types; just by way of non-limiting example they could be selected from a wide range in the nautical industry, so as to ensure both the lightness and resistance of the floating cylindrical bodies 2.

The following embodiments refer to the concepts of the first embodiment and they substantially regard the re-positioning of the load.

Figure 6:
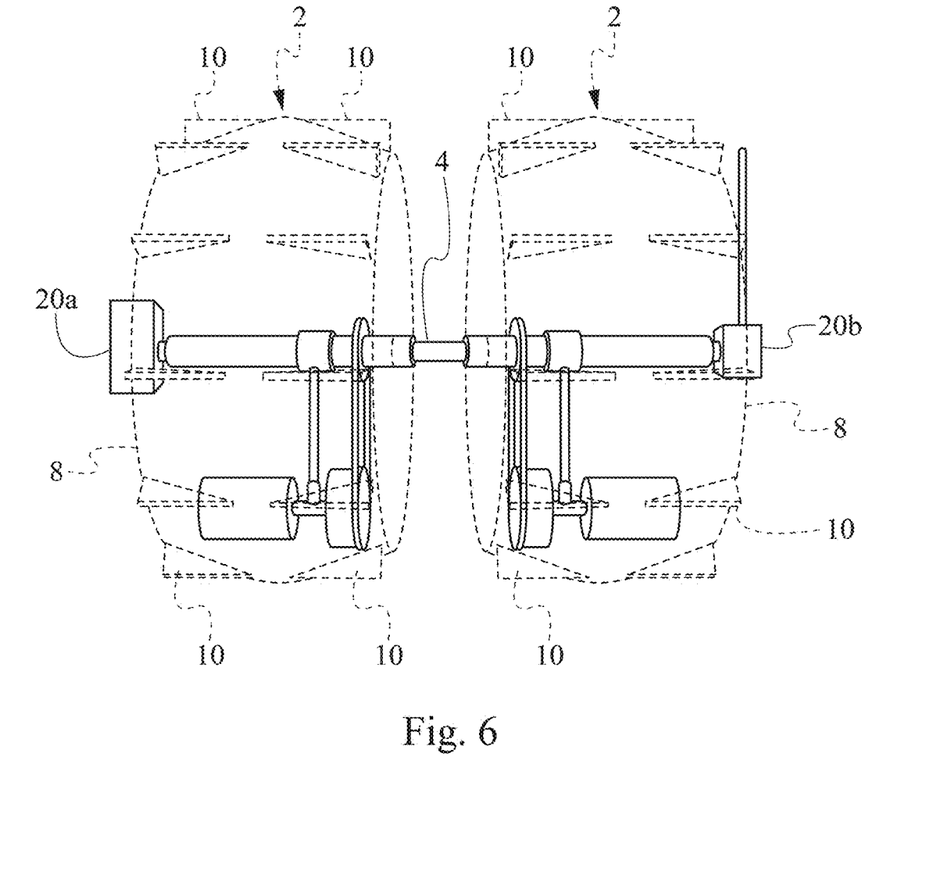
FIG. 6 shows the second embodiment of the invention, in a perspective view with a third angle (front view)

In the second embodiment of the invention (FIGS. 4-6) the load 20$a,b$ is arranged on the two ends of the secondary semi-axles 5 which in this case project from the two outer faces 8 of the cylindrical floating bodies or wheels 2 (see FIG. 6, for example). The two loads 20$a$ and 20$b$ may for example have the same weight, to optimally balance the vehicle 1. It should be observed that in this case, the two floating bodies 2 are arranged closer to each other with respect to the first embodiment of the invention shown in FIGS. 1-3, in that it is not necessary to house an additional element on the central axle 4.

Figure 7:
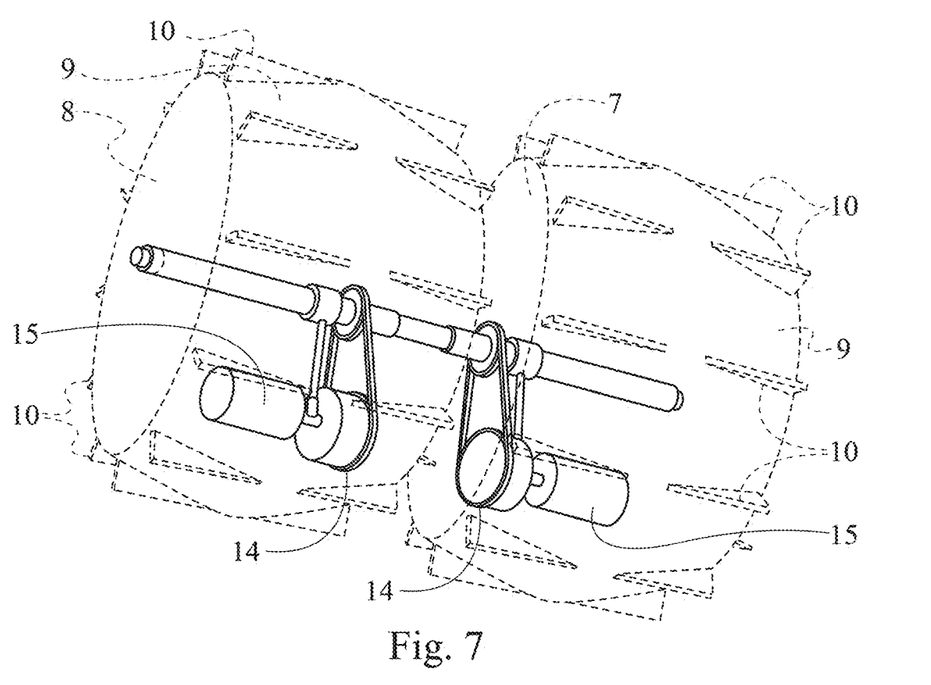
FIG. 7 shows a third possible embodiment of the invention, in a perspective view with a first angle, (bottom view)
Figure 8:
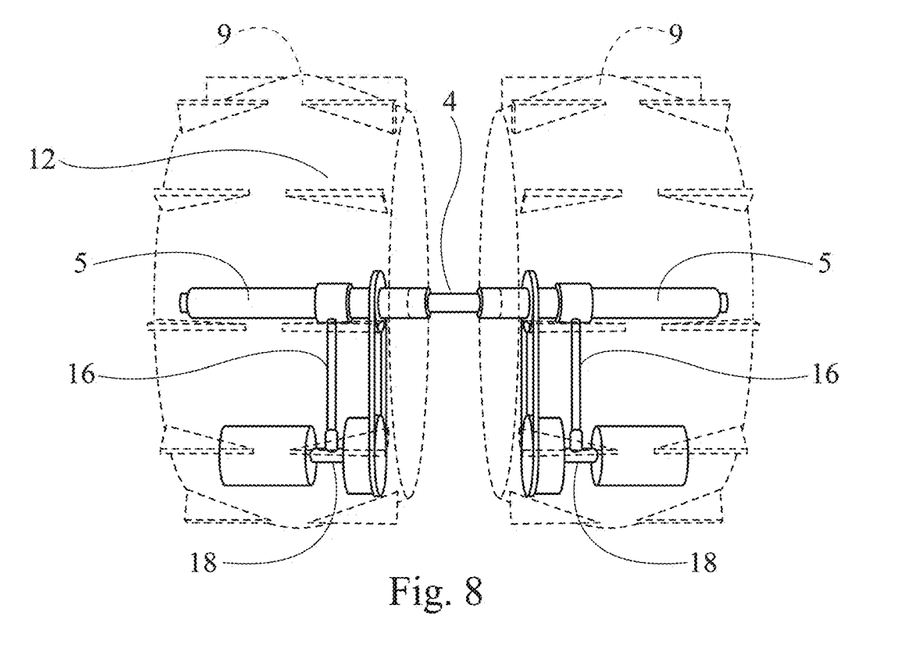
FIG. 8 shows the third embodiment of the invention, in a perspective view with a second angle (front view)
Figure 9:
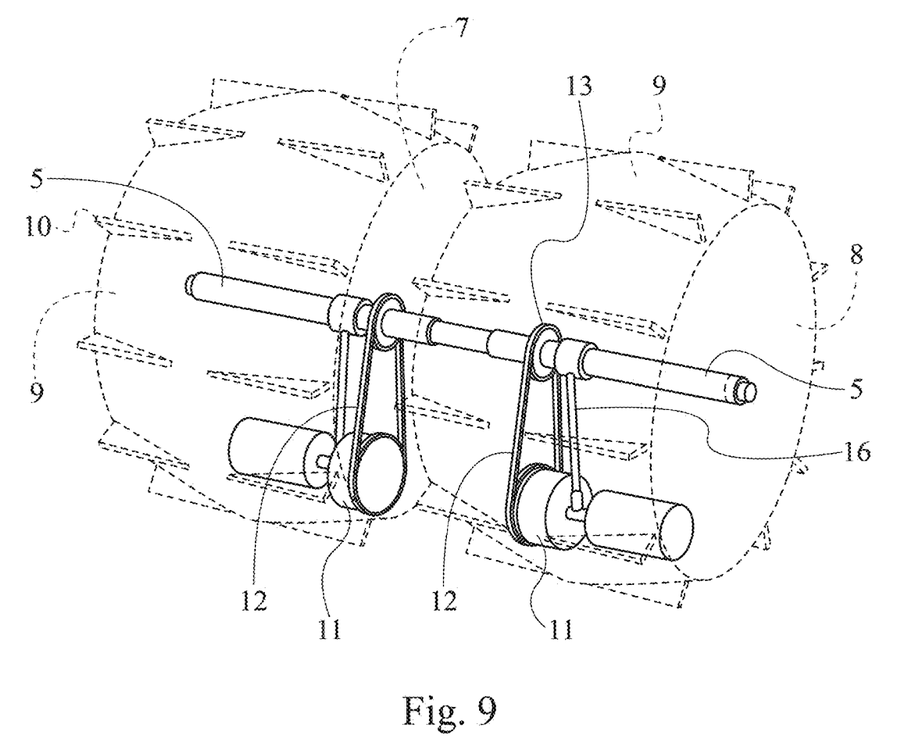
FIG. 9 shows the third embodiment of the invention, in a perspective view with a third angle.

In the third and last embodiment of the invention provided herein by way of non-limiting and non-binding example, shown in FIGS. 7-9, the amphibious vehicle 1 corresponds to the minimal form thereof, which does not provide for any load.

It should be observed that for all three embodiments, the structure of the vehicle may be used for housing antennas for example inside the floating bodies 2, like the ones integrated in the motors 11 for remote control purposes. This way, the vehicle could also serve as telecommunication means, for receiving and transmitting data and possibly also acquiring and temporarily storing information (images, etc.).

Applications

Depending on the type of load (19; 20a and 20b) mounted on the vehicle 1, the latter can be used for the following purposes:

a) A remote control vehicle for exploring wet areas. If made with electric motors and transparent floating bodies, the vehicle has extremely low environmental impact, in terms of exhaust gases as well as visual and acoustic impact. In this case, the load is mainly represented by cameras, antennas and sensors. Unless expected to cross considerable water surfaces, the vehicle does not need the blades provided for in the previous embodiments.

b) A system for the remote monitoring of sandy areas. The remarks that are the subject of point a) shall apply.

c) Monitoring and rescue systems for snowy areas; the remarks that are the subject of application a) and application b) shall apply. The vehicle may also be used in avalanche emergencies using olfactory sensors and ground penetrating radar as load. In this case, the vehicle 1 becomes a rescue means for localising objects or people covered by snow. In addition, it can also serve as a telephone signal repeater through satellite antennas in case the event occurs in an area not covered by the regular network. The overall cost of the entire system is sufficiently low to allow the use thereof in high risk areas.

d) Mobile buoy; exploiting the vehicle's capacity to move on water surfaces in remote control mode allows obtaining mobile platforms for sensors to be positioned offshore. As previously mentioned, these platforms may have minimal environmental impact. The battery may be of the long duration type thus the mobile buoy may cover considerable distances and be used for example for monitoring water quakes, the presence of pollution over long stretches facing tourism areas (beaches, etc.), carrying out microbiological analysis on sea, river water, etc., for scientific purposes or the like. The antennas and sensors will be mounted at suitable points and they shall be suitably protected.

LIST OF REFERENCE SYMBOLS 1 vehicle, in particular an amphibious vehicle
2 wheels
3 longitudinal central element
4 central axle of 3
5 secondary axles of 3
6 decouplers
7 inner lateral faces of 2
8 outer lateral faces of 2
9 rolling surface ("tread") of the wheels 2
10 fins/blades
11 drive means, electric motors
12 transmission chain
13 second gearwheel
14 first gearwheel
15 battery
16 vertical oscillating arm
17 bushing, sleeve
18 horizontal oscillating axle
19 useful load
20a useful load
20b useful load

The invention claimed is:

1. A vehicle (1), comprising:
only two parallel wheels (2), both said two parallel wheels (2) being drive wheels,
said two parallel wheels (2) constituting internally hollow bodies, each one of said two parallel wheels (2) having two lateral faces (7, 8) and a rolling surface (9) that extends therebetween and is convex towards an outside of the wheel (2),
said parallel wheels (2) being connected to each other by a longitudinal central element (3) that is formed by a central axle (4), which extends through a space between said wheels (2), and first and second secondary axles (5), each one of said first and second secondary axles (5) being inside a respective one of said parallel wheels (2),
wherein first and second decouplers are disposed at respective first and second points of transition between opposing ends of the central axle (4) and respective ones of the first and second secondary axles (5), each one of said first and second decouplers (6) configured to render a rotation motion of the central axle (4) independent from a corresponding one of the first and second secondary axles (5), as well as render a rotation motion of any one of the two secondary axles (5) independent with respect to the other one of the first and second secondary axles (5),
wherein each secondary axle (5) is rigidly connected to a respective wheel of the two parallel wheels (2), each of the first and second secondary axles (5) having an independent drive system (11) thereof in order to rotate only one of the two parallel wheels (2) independent of the other of the two parallel wheels (2), and each of said drive systems (11) being housed inside a respective one of the two parallel wheels (2),
wherein inside each one of the two parallel wheels (2) there is included means for lowering a centre of gravity of the wheel (2) with respect to a rotation axis thereof coinciding with a geometric axis of the secondary axle (5) of the wheel (2), said means configured such that during travel of the vehicle, said centre of gravity (2) is constantly situated at a lower height than said rotation axis, and
wherein each one of said two parallel wheels (2) comprise blades (10) on the rolling surface (9) thereof having a shape convex towards the exterior, said blades (10) being arranged on sides of said rolling surface (9) in proximity to the lateral faces (7, 8) of the wheels (2), in a manner so as to leave free a central rolling zone of said rolling surface (9) with a convex shape, such central rolling zone being adapted to come into contact with a solid or semi-solid surface.

2. The vehicle (1) according to claim 1, wherein each means for lowering the centre of gravity comprise the drive system (11) for driving the wheel (2) associated therewith.

3. The vehicle (1) according to claim 2, wherein the means for lowering the centre of gravity comprise, for each wheel (2), at least one vertical oscillating arm (16), connected at a first end thereof in a rotatable manner by means of a sleeve (17) to the respective secondary axle (5) of the wheel (2), said vertical oscillating arm (16) supporting at a second end thereof a horizontal oscillating arm (18) for supporting said drive system (11).

4. The vehicle (1) according to claim 1, wherein the means for lowering the centre of gravity comprise, for each wheel (2), at least one vertical oscillating arm (16), connected at a first end thereof in a rotatable manner by means of a sleeve (17) to the respective secondary axle (5) of the wheel (2), said vertical oscillating arm (16) supporting at a second end thereof a horizontal oscillating arm (18) for supporting said drive system (11).

5. The vehicle (1) according to claim 1, wherein said centre of gravity of each wheel (2) is situated in proximity to an internal diametral surface of the wheel (2).

6. The vehicle (1) according to claim 1, wherein the vehicle (1) constitutes an amphibious vehicle, wherein the centre of gravity of each one of said two parallel wheels (2) is situated below a float line of the wheel (2).

7. The vehicle (1) according to claim 1, wherein the means for lowering the centre of gravity comprise ballast.

8. The vehicle (1) according to claim 1, wherein the vehicle is equipped for transporting a load on the central axle (4) and/or in a distributed manner on external ends of the secondary axles (5) of the wheels (2), and/or within the wheels (2) on the secondary axle (5) of said wheel (2).

9. The vehicle (1) according to claim 8, wherein the load (19) arranged on the central axle (4) has an offset centre of gravity with respect to the central axle (4), constantly arranged below the central axle (4) during motion of the vehicle (1).

10. The vehicle (1) according to claim 1, wherein the vehicle is remote controlled and has means for receiving the control signals operatively connected to said drive systems (11).

11. The vehicle of claim 10, wherein the means for receiving the control signals is integrated into the driving systems of the wheels.

12. The vehicle (1) according to claim 1, wherein the load comprises one or more of the following elements: olfactory sensors, chip-integrated sensors, image sensors, sensors for detecting environmental conditions, electronic means for data acquisition, storage and transceiving, antennas, satellite antennas, batteries, signal lights, and navigation lights.

13. The vehicle (1) according to claim 1, wherein said drive systems (11) of the first and second secondary axles (5) comprise electric motors (15) for which power is supplied via battery.

14. The vehicle (1) according to claim 1, wherein the drive systems (11) are coupled with a transmission (12, 13, 14).

15. The vehicle (1) according to claim 1, wherein the two parallel wheels (2) are made of transparent material, and the drive systems (11) comprise electric motors.

16. The vehicle (1) according to claim 1, wherein the drive systems (11) allow driving the two parallel wheels (2) in both rotation directions in a manner such that the vehicle can carry out any of the following movements:

straight movement, rotation in place, movement on any one curved trajectory, straight reverse movement, reverse movement on any curved trajectory.

17. The vehicle (1) according to claim 1, configured for amphibious means for exploring wet areas, as a system for the remote monitoring of sandy zones, as a control and rescue system for snowy zones, or as a movable buoy.

\* \* \* \* \*